United States Patent [19]

Johnsen et al.

[11] Patent Number: 5,500,469

[45] Date of Patent: Mar. 19, 1996

[54] PREPARATION OF A NOVEL ARTICLE FROM A THERMALLY GELLABLE ARTIFICIAL LATEX

[75] Inventors: Kenneth E. Johnsen, Newport, R.I.; Ronald R. Pelletier, Midland, Mich.

[73] Assignee: The Dow Chemical Company, Midland, Mich.

[21] Appl. No.: 310,822

[22] Filed: Sep. 22, 1994

[51] Int. Cl.$^6$ .................. C08K 5/41; C08L 81/08
[52] U.S. Cl. ............ 524/157; 524/158; 128/844; 128/918
[58] Field of Search ............... 524/157, 158; 128/844, 918

[56] References Cited

U.S. PATENT DOCUMENTS

| 3,135,716 | 6/1964 | Uraneck et al. | 525/122 |
|---|---|---|---|
| 3,150,209 | 9/1964 | Short et al. | 525/209 |
| 3,238,173 | 3/1966 | Bailey et al. | 524/505 |
| 3,360,599 | 12/1967 | Nyberg et al. | 264/216 |
| 3,496,154 | 2/1970 | Wofford et al. | 526/174 |
| 3,498,960 | 3/1970 | Wofford et al. | 526/180 |
| 3,503,917 | 3/1970 | Burke, Jr. | 523/328 |
| 3,644,313 | 2/1972 | Chong et al. | 526/174 |
| 4,123,403 | 10/1978 | Warner et al. | 523/313 |
| 4,145,298 | 3/1979 | Trepka | 252/51.5 A |
| 4,169,115 | 9/1979 | Tung et al. | 525/314 |
| 4,963,623 | 10/1990 | Miller et al. | 525/237 |
| 5,037,864 | 8/1991 | Anand et al. | 523/348 |
| 5,084,514 | 1/1992 | Szczechura et al. | 525/123 |

*Primary Examiner*—Paul R. Michl
*Assistant Examiner*—John J. Guarriello

[57] ABSTRACT

An artificial latex comprising a stable aqueous colloidal dispersion of a preformed multiblock copolymer prepared using a sulfate of an ethoxylated phenol as a dispersing and stabilizing agent is described. This composition is particularly suitable for preparing articles such as gloves or condoms that are free of vulcanizing agents and proteins.

19 Claims, No Drawings

PREPARATION OF A NOVEL ARTICLE FROM A THERMALLY GELLABLE ARTIFICIAL LATEX

BACKGROUND OF THE INVENTION

This invention relates to a thermally gellable artificial latex composition useful for preparing an article such as a glove, a condom, or a balloon.

In view of the alarming increase in the incidence of contagious diseases, there has been an increasing need for protective materials, such as gloves and condoms. These protective materials are commonly made from a natural rubber latex or polyvinylchloride (PVC). Natural rubber latex gloves are preferred because they are more comfortable than PVC, but suffer from some serious disadvantages. First, the rubber vulcanization chemicals used in the manufacturing process are known to cause severe skin sensitization. Second, proteins present in natural rubber can cause an immunoglobulin E mediated allergic reaction in sensitized individuals, leading to anaphylaxis. It would therefore be desirable to find an alternative protective material that has equivalent performance as natural rubber without the disadvantages.

Preformed polymers colloidally dispersed in an aqueous medium (artificial latexes) are known and are chiefly used in the fields of coatings and additives. Artificial latexes can be prepared in the absence of vulcanizing agents and proteins by the steps of: 1) providing a solution of a copolymer in a volatile organic solvent; 2) emulsifying the solution with water and an aqueous emulsifier; and 3) removing the volatile organic solvent from the emulsion; and 4) adjusting the solids content if desired. Preparations of copolymers are described in U.S. Pat. Nos. 3,135,716 3,150,209, 3,496,154, 3,498,960, 4,145,298, and 4,169,115. Preparations of artificial latexes are described in U.S. Pat. Nos. 3,360,599, 3,503,917, 4,123,403, and U.S. Pat. No. 5,037,864, all incorporated herein by reference.

There remains a need for artificial latex compositions suitable for preparing articles that have the high tensile strength and the high elongation at break of natural rubber, without the drawbacks.

SUMMARY OF THE INVENTION

The present invention is an artificial latex comprising a stable aqueous colloidal dispersion of a preformed multiblock copolymer, the dispersion being stabilized by a stabilizing amount of a sulfate of an ethoxylated phenol, the multiblock copolymer having the formula:

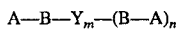

wherein each A is independently a polymer block of an alkenyl aromatic hydrocarbon, the total A being at least 5 weight percent of the total weight of the polymer; Y is the remnant of a multifunctional coupling agent; m is 0 or 1; n is an integer from 1 to 5; and B comprises a polymer block of a conjugated diene; and the sulfate of the ethoxylated phenol having the formula:

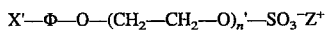

wherein X' is a $C_6$–$C_{18}$ linear or branched alkyl group; $\Phi$ is phenylene; n' is from 4 to 32; and Z is sodium, potassium, or ammonium.

In another aspect, the present invention is a process for preparing an article comprising the steps of:

a) immersing a preheated mold into a bath of an artificial latex having a gellation point, the latex comprising a stable aqueous colloidal dispersion of a multiblock copolymer, the particles being stabilized by a stabilizing amount of a sulfate of an ethoxylated phenol, the mold being preheated to a temperature above the gellation point of the latex so that a gelled latex adheres to the mold, the multiblock copolymer having the formula:

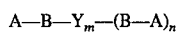

wherein each A comprises independently a polymer block of an alkenyl aromatic hydrocarbon, the total A being at least 5 weight percent of the total weight of the polymer; Y is the remnant of a multifunctional coupling agent; m is 0 or 1; n is an integer from 1 to 5; and B comprises a polymer block of a conjugated diene; and the sulfate of the ethoxylated phenol having the formula:

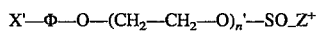

wherein X is a $C_6$–$C_{18}$ linear or branched alkyl group; $\Phi$ is phenylene; n is from 4 to 32; and Z is sodium, potassium, or ammonium;

b) removing the mold and the gelled latex adhering thereto from the bath; and c) drying the gelled latex at a temperature above the gellation point of the latex.

In yet another aspect, the invention is an artificial latex-derived article comprising a multiblock copolymer and a sulfate of an ethoxylated phenol, the multiblock copolymer having the formula:

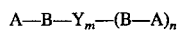

wherein each A comprises independently a polymer block of an alkenyl aromatic hydrocarbon, the total A being at least 5 weight percent of the total weight of the polymer; Y is the remnant of a multifunctional coupling agent; m is 0 or 1; n is an integer from 1 to 5; and B comprises a polymer block of a conjugated diene; and the sulfate of the ethoxylated phenol having the formula:

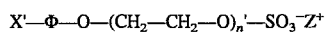

wherein X is a $C_6$–$C_{18}$ linear or branched alkyl group; $\Phi$ is phenylene; n is from 4 to 32; and Z is sodium, potassium, ammonium, or hydrogen.

The composition of the present invention is suitable for preparing artificial latex articles that exhibit equivalent performance to natural rubber gloves, but without sensitizing vulcanizing agents or proteins.

DETAILED DESCRIPTION OF THE INVENTION

The artificial latex of the present invention is prepared by forming a colloidal dispersion of a multiblock copolymer that is stabilized with an anionic surfactant which is a sulfate of an ethoxylated phenol. The multiblock copolymer is represented by the formula:

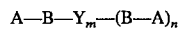

wherein each A comprises independently a polymer block of an alkenyl aromatic hydrocarbon, the total A being at least 5 weight percent of the total weight of the polymer; Y is the remnant of a multifunctional coupling agent, preferably a difunctional organolithium 0 initiator; m is 0 or 1; n is an integer from 1 to 5, preferably from 1 to 3, more preferably 1; and B comprises a polymer block of a conjugated diene. The total A is preferably from about 10, more preferably from about 15 to preferably about 25, more preferably to about 20 weight percent of the total weight of the polymer. The block copolymer is prepared by anionic polymerization, as disclosed in the above-cited references.

The weight average molecular weight of each A is advantageously from about 5,000 to about 20,000 Daltons, and the weight average molecular weight of B is advantageously 40,000 to 200,000 Daltons. The number average molecular weight of the triblock copolymer is preferably from about 75,000, more preferably from about 100,000, most preferably from about 120,000, to preferably 200,000, more preferably to 175,000, and most preferably to 150,000 Daltons.

Preferred alkenyl aromatic hydrocarbons are alkyl-substituted styrenes; more preferred are styrene, α-methylstyrene, and vinyltoluene, with styrene being most preferred. Preferred conjugated dienes are $C_4$–$C_8$ conjugated dienes; more preferred are 1,3-butadiene, isoprene, 2,3-dimethyl-1,3-butadiene, 1,3-pentadiene, and 3-methyl-1,3-pentadiene; 1,3-butadiene and isoprene are most preferred.

The sulfate of an ethoxylated phenol is represented by the formula:

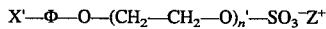

wherein X is a $C_6$–$C_{18}$ linear or branched alkyl group, preferably octyl, nonyl, or lauryl, more preferably octyl or nonyl, most preferably nonyl; Φ is phenylene, preferably para-phenylene; n is from 4 to 32, preferably from 4 to 12; and Z is sodium, potassium, or ammonium, preferably ammonium. Many of the preferred and more preferred sulfates of ethoxylated alkylphenols are commercially available, for example, poly(oxy-1,2-ethanediyl) α-sulfo-ω(nonylphenoxy) ammonium salt.

The surfactant is used in an amount sufficient to form a stable aqueous colloidal dispersion of the multiblock copolymer. Preferably the surfactant is used in concentrations ranging from about 1, more preferably from about 2, to preferably about 10, more preferably to about 5 weight percent based on the weight of solids.

Preparation of the Artificial Latex

The artificial latex is preferably prepared in the manner described in, for example, U.S. Pat. No. 3,360,599 or U.S. Pat. No. 4,123,403, incorporating a sulfate of an ethoxylated phenol into the process. In a first step of the preferred process, the multiblock copolymer is dissolved in sufficient quantities of a nonpolar hydrocarbon solvent to form an organic phase containing about 20 to about 50 weight percent solids.

Preferred hydrocarbon solvents are $C_5$–$C_{12}$ linear, branched, cyclic, aromatic, and aliphatic solvents. More preferred solvents include isopentane, hexane, cyclohexane, toluene, xylene, and mesitylene, or mixtures thereof. Most preferred are isopentane, hexane, or cyclohexane, or mixtures thereof.

In a second step of the preferred process, water, the surfactant, and the organic phase are combined to make the colloidal dispersion. The manner in which these reagents are combined is not critical. The surfactant and water may be added to the organic phase with mixing and in sufficient amounts to bring about a phase inversion (wherein the polymer becomes colloidally dispersed in water) and stabilized by the surfactant. Alternatively, the organic phase can be added to sufficient quantities of the water and surfactant to achieve a stable colloidal dispersion. Preferably, the water is present in sufficient amounts to reduce the solids content to about 10 to about 35 weight percent.

The mixing is achieved by contacting the reagents under shear designed to generate the desired particle size. In a preferred embodiment, a high speed agitator is used to provide good shear to form and control particle size.

In a third step of the preferred process, the hydrocarbon solvent is removed from the mixture by any conventional means, such as steam distillation or rotary evaporation. After the hydrocarbon is removed, the resultant artificial latex contains, or is adjusted to contain from about 30, preferably from about 45, more preferably from about 50 weight percent solids, to about 65, preferably to about 60, more preferably to about 55 weight percent solids, based on the total weight of the latex. Any suitable means for adjusting solids content may be used, including dilution, evaporation, or centrifugation.

The artificial latex may optionally include antioxidants, such as butylated hydroxytoluene, tris(nonylphenyl)phosphite; preservatives, such as sodium dimethyldithiocarbamate, or sodium 2mercaptobenzothiazole; or wetting agents, such as sodium lauryl sulfate; but may be absent of any component not specifically disclosed herein.

The artificial latex of the present invention undergoes a rapid rise in viscosity above a critical temperature, which, for the purposes of this specification, is the gellation point. The gellation point of these latexes is from 50° C., preferably from about 60° C., more preferably from about 70° C., to about 100° C., preferably to about 90° C., more preferably to about 80° C. The mold is preheated to a temperature above the gellation point, preferably at least 10° C. above the gellation point. A mold preheated to a temperature above such critical temperature, when immersed in, then withdrawn from the thermally gellable latex, will form a thicker coating than if the mold were at or below the critical temperature, or if the latex were not thermally gellable.

Forming an Article From the Artificial Latex

To form an article from the artificial latex of the present invention, a mold, such as a ceramic glove mold, is preheated to a temperature sufficiently high to cause the latex to thermally gel upon immersion of the mold, but sufficiently low so as not to cause the latex to boil. Preferably, the mold is preheated to a temperature ranging from about 55° C., preferably from about 70° C., and more preferably from about 80° C., to about 120° C., preferably to about 110° C., and more preferably to about 100° C.

Preferably, the mold is dipped into a release agent, such as a cornstarch slurry, then dried and heated prior to immersion in the artificial latex. This release agent facilitates the removal of the article from the mold. After immersion and while still hot, the artificial latex-coated mold may be dipped again into the release agent so that both sides of the glove acquire sufficient powder to be detackified.

A dewebbing agent is advantageously added to the artificial latex just prior to immersion of the hot mold. This dewebbing agent, when used in sufficient quantities, suppresses or even eliminates webbing as well as pinholes in the article.

A suitable dewebbing agent is an acetylenic diol or an ethoxylated acetylenic diol, such as a dimethyl octynediol, a tetramethyl decynediol, a tetramethyl dodecynediol, an ethoxylated dimethyl octynediol, an ethoxylated tetramethyl decynediol, an ethoxylated tetramethyl dodecynediol, or combinations thereof, all of which are commercially available. Typically, these dewebbing agents are effective when used at levels preferably ranging from about 0.1, more preferably from about 0.5, to about 2, more preferably about 1 weight percent, based on the weight of the latex. Because acetylenic glycols tend to lose efficacy in time, it is preferable to add these types of dewebbing agents just before immersing the mold into the latex.

Film thickness of the artificial latex article can be controlled by a number of factors including solids content of the artificial latex, temperature of the mold, temperature of the latex, number of immersions, and duration of immersion. Film thickness will tend to increase with solids content of the artificial latex over a certain range. Increasing the temperature of the mold will also tend to increase thickness. Multiple immersions are advantageously carried out by partially drying the film between immersions of the mold into the latex, then completely drying the film after the final immersions.

The temperature of the latex can also affect the thickness of the film because this temperature affects the rate at which heat from the mold dissipates. The latex temperature can be as high as the point below which thermal gellation occurs, but is preferably not higher than 40° C. More preferably, the latex is maintained at about ambient temperature prior to the immersion of the preheated mold.

The relationship between film thickness and duration of immersion is complex. In the beginning, film thickness tends to increase with time, but as the mold cools, the film actually tends to become thinner and less uniform.

The mold is immersed in the artificial latex for a time sufficient to build desired thickness of a gelled latex film, then removed and dried at sufficient temperatures to maintain this thickness. Drying is preferably carried out at or above the pre-immersion temperature of the mold. After drying, the mold is then allowed to cool, whereupon the film may optionally be treated with a powder, such as corn starch.

The dried article contains the multiblock copolymer and anionic surfactant described herein. However, where the artificial latex contains an ammonium salt of an ethoxylated phenol, the dried article may contain a significant amount of the corresponding hydrogen sulfate, due to the loss of ammonia. The article made from the artificial latex containing the ammonium salt is particularly useful for applications in the electronic industry, where alkaline earth salt-and alkali metal salt-free gloves are highly desirable.

The following examples are provided to illustrate the invention, but is not intended to limit the scope thereof. All parts and percentages are by weight unless otherwise indicated.

EXAMPLE 1

Preparation of an Artificial Latex Glove

An SIS (styrene-isoprene-styrene) block copolymer containing 18% styrene and 82% isoprene and having a weight average molecular weight of about 130,000 Daltons is prepared via anionic polymerization techniques in anionic purity grade cyclohexane. (See, for example, U.S. Pat. No. 4,169,115.) The SIS polymer is recovered from the polymerization media by extrusion devolatilization, after which 100 g of the polymer is dissolved in technical grade cyclohexane (150 g). This solution is pumped at 90 g/min to a Kenix static mixer where it is admixed with a stream of 58% active poly(oxy-1,2 ethanediyl)α-sulfo-ω(nonylphenoxy) ammonium salt (Rhodapex CO436, Trademark of Rhone-Poulenc) which is flowing at a rate of 1.7 g/min. The admixture is pumped at 91.7 g/min into an apparatus as described in U.S. Pat. No. 4,123,403 operating at 1100 rpm. Water is injected into the apparatus annulus at 47.6 g/min and a crude emulsion product is recovered at a rate of 140.5 g/min. The crude, solvent-containing colloidal dispersion is transferred to a rotary evaporator where the cyclohexane and a portion of the water is removed. The solids content of the solvent-free artificial latex is determined to be 52 weight percent.

A glazed porcelain ceramic glove mold is thoroughly washed, then heated to 90° C. The mold is then immersed into the artificial latex over a period of ten seconds and allowed to dwell at full depth for thirty seconds, after which it is withdrawn over a ten-second period. Upon withdrawal from the bath, the mold is inverted to a finger up position and placed into the circulating air oven at 120° C. for 20 minutes. The dry glove and the mold are removed from the oven and allowed to cool for ten minutes.

A cuff bead is then formed onto the glove by hand by rolling approximately 1.5" of SIS film on the forearm section of the mold toward the fingers. This film is sufficiently tacky to form a strong, coherent bead. After cooling to substantially room temperature, the glove is lightly dusted with a finely divided crosslinked cornstarch powder. The glove is then peeled back from the mold powdered on the outside (formerly the side contacting the mold surface) and examined.

The glove, which has a smooth uniform appearance, has a film thickness of 0.0035" from the fingers to the palm to the wrist area. Approximately 500 ml water is introduced into the glove and no leaks are observed over a period of ten minutes.

The glove exhibits a tensile strength of 0 2878 psi, an elongation at break of greater than 1000%, and a modulus at 50% elongation of 29 psi (all properties being determined in accord with ASTM D-612). Thus, the glove meets the standards set by ASTM D-3577 Standard Specifications for Rubber Surgical Gloves, Type II.

EXAMPLE 2

Preparation of an Artificial Latex Glove with Predipping of the Mold in a Cornstarch Slurry The procedure described in Example 1 is followed except that the clean mold is dipped in a 1-percent slurry of crosslinked corn starch in water prior to being preheated. The hot, dry, powder coated mold is dipped into the artificial latex as described in Example 1 and dried at 120° C. Upon removal from the drying oven and while still hot, the coated mold is again dipped in the starch slurry whereupon it is cooled to a temperature suitable for handling. When the glove is removed from the mold, it is found that both sides of the glove have acquired sufficient starch powder to be essentially detackified.

EXAMPLE 3

Preparation of an Artificial Latex Glove in the Presence of an Ethoxylated Tetramethyl Decynediol The procedure is essentially the same as Example 1 except that 0.75% of an ethoxylated tetramethyl decynediol based on the weight of bath solids is added to the latex bath just prior to the immersion of the mold. After dipping the mold in the usual fashion, it is observed that the tendency of the latex to form a web between adjacent fingers is substantially reduced as compared to Example 1.

EXAMPLE 4

Glove Thickness as a Function of Solids Content of the Artificial Latex

Four gloves are prepared as described in Example 3 except that the dip bath is adjusted with water to solids contents of 40%, 45%, and 52%, the mold is preheated to 120° C., and the dip holding time is ten seconds. Dry SIS film deposits of 0.0020", 0.0036" and 0.0044" are recorded for the various bath solids contents, demonstrating that the dry film thickness can be readily varied by proper manipulation of bath concentrations.

EXAMPLE 5

Preparation of an Artificial Latex by a Double Mold Immersion

The procedure of Example 4 is followed using a 40% solids dip bath. A 120° C. mold is immersed over ten seconds into the bath, held for ten seconds, then withdrawn over ten seconds. The latex-covered mold is then placed in a 120° C. oven for five minutes to partially dry the latex film after which it is removed from the oven and the same dipping sequence repeated by a thorough drying at 120° C. for 20 minutes. The final glove has a dry film thickness of 0.004" and is excellent in appearance.

What is claimed is:

1. A process for preparing an artificial latex article comprising the steps of:

a) immersing a preheated mold into a bath of an artificial latex having a gellation point, the latex comprising a stable aqueous colloidal dispersion of a multiblock copolymer, the particles being stabilized by a stabilizing amount of a sulfate of an ethoxylated phenol, the mold being preheated to a temperature above the gellation point of the latex so that a gelled latex adheres to the mold, the multiblock copolymer having the formula:

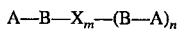
    A—B—X$_m$—(B—A)$_n$ wherein each A comprises independently a polymer block of an alkenyl aromatic hydrocarbon, the total A being at least 5 weight percent of the total weight of the polymer; X is the remnant of a multifunctional coupling agent; m is 0 or 1; n is an integer from 1 to 5; and B comprises a polymer block of a conjugated diene; and the sulfate of the ethoxylated phenol having the formula:

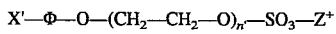
    X'—Φ—O—(CH$_2$—CH$_2$—O)$_{n'}$—SO$_3$—Z$^+$ wherein X' is a C$_6$-C$_{18}$ linear or branched alkyl group; Φ is phenylene; n' is from 4 to 32; and Z is sodium, potassium, or ammonium;

b) removing the mold and the gelled latex adhering thereto from the bath; and c) drying the gelled latex at a temperature above the gellation point of the latex.

2. The process of claim 1 wherein the alkenyl aromatic hydrocarbon is selected from the group consisting of styrene, α-methylstyrene, and vinyltoluene.

3. The process of claim 2 wherein the conjugated diene is selected from the group consisting of isoprene, and butadiene.

4. The process of claim 3 wherein the sulfate of an ethoxylated phenol is poly(oxy-1,2 ethanediyl)α-sulfo-ω(nonylphenoxy) ammonium salt.

5. The process of claim 4 wherein the poly( oxy-1,2 ethanediyl ) α-sulfo- ω(nonylphenoxy) ammonium salt comprises about 2 to about 5 weight percent of the latex based on the weight of the block copolymer.

6. The process of claim 5 wherein the mold is heated to a temperature in the range of about 70° C. and about 120° C. prior to immersing the mold into the bath.

7. The process of claim 6 wherein about 0.5 to about 1 weight percent of an acetylenic diol or an ethoxylated acetylenic diol selected from the group consisting of a tetramethyl decynediol, a dimethyl octynediol, a tetramethyl dodecynediol, an ethoxylated tetramethyl decynediol, an ethoxylated dimethyl octynediol, and an ethoxylated tetramethyl dodecynediol, based on the weight of solids is added to the bath prior to immersing the mold into the bath.

8. An artificial latex comprising a stable aqueous colloidal dispersion of a preformed multiblock copolymer, the dispersion being stabilized by a stabilizing amount of a sulfate of an ethoxylated phenol, the multiblock copolymer having the formula:

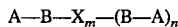
A—B—X$_m$—(B—A)$_n$ wherein each A comprises independently a polymer block of an alkenyl aromatic hydrocarbon, the total A being at least 5 weight percent of the total weight of the polymer; X is the remnant of a multifunctional coupling agent; m is 0 or 1; n is an integer from 1 to 5; and B comprises a polymer block of a conjugated diene; and the sulfate of the ethoxylated phenol having the formula:

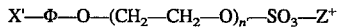
X'—Φ—O—(CH$_2$—CH$_2$—O)$_{n'}$—SO$_3$—Z$^+$ wherein X' is a C$_6$-C$_{18}$ linear or branched alkyl group; Φ is phenylene; n' is from 4 to 32; and Z is sodium, potassium, or ammonium.

9. The artificial latex of claim 8 wherein each A is independently selected from the group consisting of styrene, α-methylstyrene, and vinyltoluene.

10. The composition of claim 9 wherein B is selected from the group consisting of 1,3-butadiene, isoprene, 2,3-dimethyl-1,3-butadiene, 1,3-pentadiene, and 3-methyl-1,3-pentadiene.

11. The composition of claim 10 wherein each A is styrene, and B is 1,3-butadiene or isoprene.

12. The composition of claim 11 wherein the amount of A is in the range of about 10 to 25 weight percent based on the total weight of A and B, and the amount of B is in the range of 75 to 90 weight percent based on the total weight of A and B.

13. The composition of claim 12 wherein the weight average molecular weight of the triblock copolymer is in the range of 100,000 to 150,000 Daltons.

14. The composition of claim 13 wherein the weight percent of the triblock copolymer in the aqueous medium is in the range of 45 to 55 weight percent based on the total weight of copolymer and water.

15. The composition of claim 14 wherein X' is octyl, nonyl, or lauryl; Φ is para phenylene n' is from 4 to 12; and Z is ammonium.

16. The composition of claim 15 wherein the sulfate of an ethoxylated phenol is poly(oxy-1,2 ethanediyl)α-sulfo-ω(nonylphenoxy) ammonium salt.

17. An artificial latex-derived article comprising a multiblock copolymer and a sulfate of an ethoxylated phenol, the multiblock copolymer having the formula;

$$A-B-X_m-(B-A)_n$$

wherein each A comprises independently a polymer block of an alkenyl aromatic hydrocarbon, the total A being at least 5 weight percent of the total weight of the polymer; X is the remnant of a multifunctional coupling agent; m is 0 or 1; B comprises a polymer block of a conjugated diene; and the sulfate of the ethoxylated phenol having the formula:

$$X'-\Phi-O-(CH_2-CH_2-O)_{n'}-SO_3-Z^+$$

wherein X' is a $C_6-C_{18}$ linear or branched alkyl group; $\Phi$ is phenylene; n' is from 4 to 32; and Z is sodium, potassium, ammonium, or hydrogen.

18. The article of claim 17, wherein Z is ammonium or hydrogen.

19. The article of claim 18 which is a condom, a glove, or a balloon.

* * * * *